April 25, 1961 R. C. ZEIDLER 2,981,376
DISC BRAKE
Filed Jan. 27, 1958 4 Sheets-Sheet 1

Inventor:
Reinhold C. Zeidler
By: Francis T. Drum Atty.

April 25, 1961 R. C. ZEIDLER 2,981,376
DISC BRAKE
Filed Jan. 27, 1958 4 Sheets-Sheet 2

Inventor:
Reinhold C. Zeidler
By: Francis T. Drumm
Atty.

April 25, 1961 R. C. ZEIDLER 2,981,376
DISC BRAKE
Filed Jan. 27, 1958 4 Sheets-Sheet 3

Inventor:
Reinhold C. Zeidler
By: Francis T. Drumm Atty.

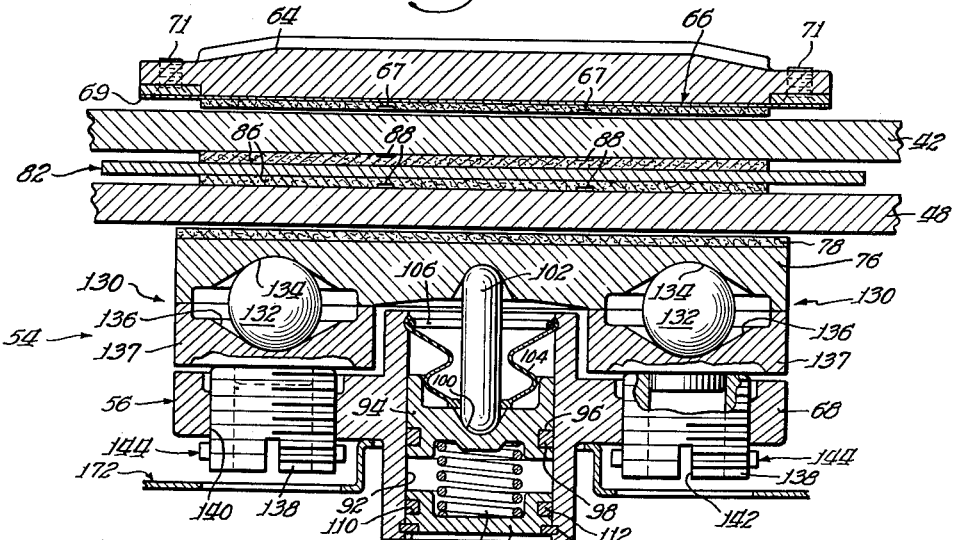

United States Patent Office 2,981,376
Patented Apr. 25, 1961

2,981,376

DISC BRAKE

Reinhold C. Zeidler, Detroit, Mich., assignor to Borg-Warner Corporation, a corporation of Illinois Filed Jan. 27, 1958, Ser. No. 711,521

9 Claims. (Cl. 188—73)

This invention relates to disc brakes and more particularly to a disc brake of the multiple disc type.

A primary object of the invention is to provide a disc brake of the multiple disc type in which cooling air may be circulated into contact with the areas of frictional contact and in which contamination of these areas is effectively precluded.

A further object of the invention is to provide a disc brake of the stated type in which a plurality of radially inwardly extending annular rotatable discs are provided and in which a unitary self-contained friction unit is mounted on the brake assembly in a manner to facilitate convenient installation and servicing.

Another object of the invention is to provide a disc brake of the mentioned character in which means are provided for self-energization and in which readily accessible resilient means are provided to retract the friction elements upon completion of braking.

A further object of the invention is to provide a disc brake having convenient means for effecting radiation of the frictional heat while at the same time affording convection of air from the areas of frictional contact.

Another object of the invention is to provide a disc brake in which means are provided for inducing turbulence in the air immediately adjacent to the discs to prevent the formation of a layer of stagnant air on the disc surfaces.

Another object of the invention is to provide a disc brake of the stated type in which the outer marginal edges of the disc are corrugated to afford the required rigidity and to prevent distortion.

Another object of the invention is to provide a brake of the stated type in which means are provided for compensating for wear of the friction elements and wherein indexing means are provided for locking said compensating means in finite positions.

A further object of the invention is to provide a disc brake of the type described in which stationary perforate metallic panels are arranged in limited spaced relation to the rotating discs for turbulizing the air at the disc surfaces and for absorbing heat by radiation from the discs.

Another object of the invention is to provide a disc brake of the stated type in which means are provided for inducing an inclination of cooling air around the rotating discs and the stationary panels and in which means are provided for shielding the discs from contamination by water, road dust and the like.

These and other objects and features of the invention will be apparent from the specification when taken with the accompanying drawings, in which:

Figure 5 is a cross-sectional view taken substantially on line 5—5 of Figure 3;

Figure 6 is an enlarged vertical sectional view taken substantially on line 6—6 of Figure 1;

Figure 7 is a cross-sectional view taken substantially on line 7—7 of Figure 6;

Figure 1:
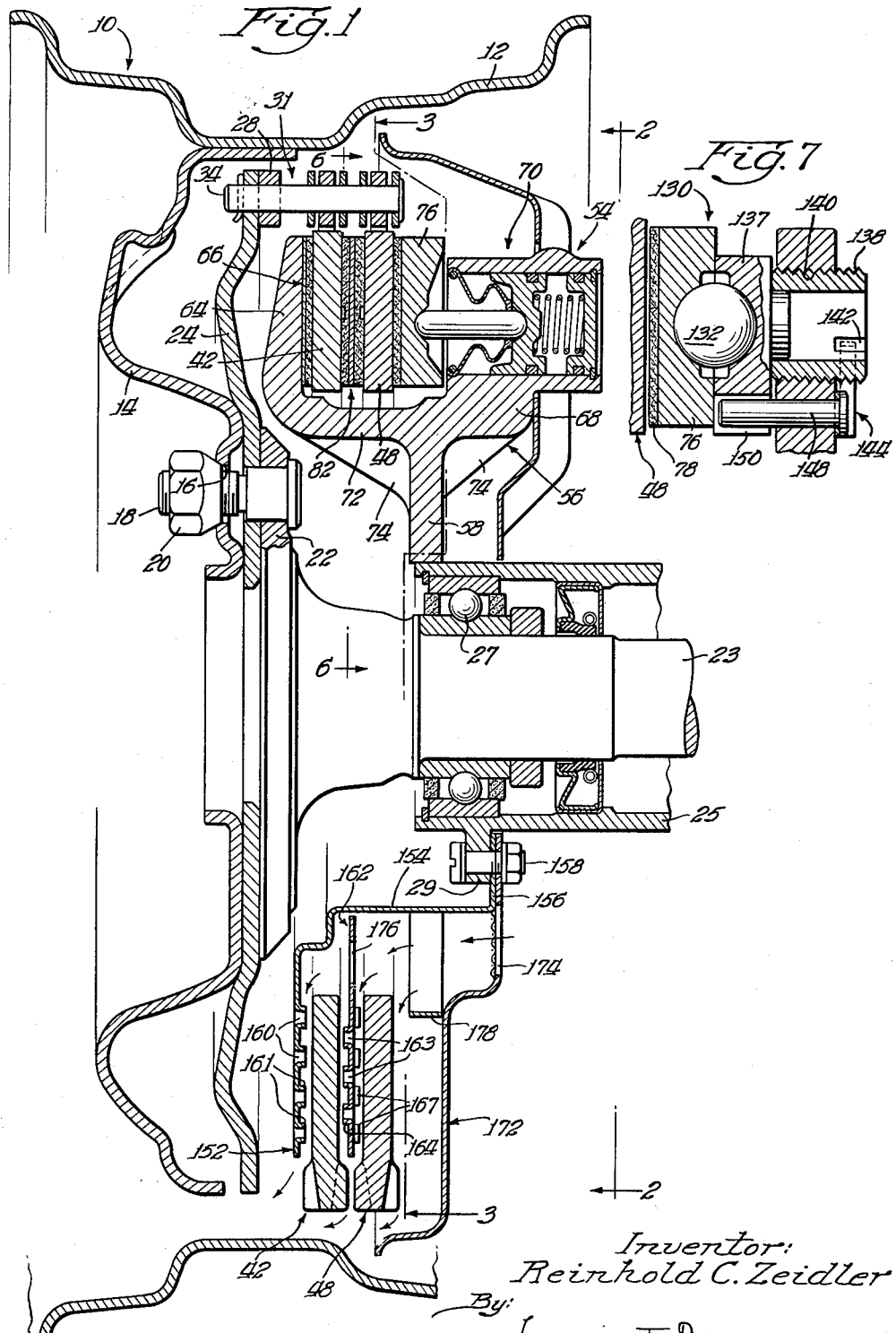
Figure 1 is an elevational sectional view of a disc brake made in accordance with the present invention.

Referring now to the drawings and more particularly to Figure 1 the disc brake of the present invention is illustrated in association with a vehicle wheel indicated by a reference numeral 10 and comprising a rim 12 and a web 14 provided at its inner-marginal edge with a plurality of circumferentially spaced openings 16 for reception of threaded lugs 18. Lug nuts 20 are threadedly received on the lugs 18 for securing the web 14 to a flange 22 which is rotatable with vehicle axle 23. The axle 23 is journalled in a fixed sleeve 25 by means of a ball bearing assembly 27. The sleeve 25 has a radially outwardly extending flange 29 for a purpose hereafter described.

Secured to the outer face of the flange 22 is an annulus or ring 24 somewhat dished in configuration and having affixed to the outer marginal edge thereof by means of rivets 26 a plurality of circumferentially spaced connection assemblies 31 each of which includes a bracket 28 having an inwardly extending arm 30 and a pair of arms 32 and 34 extending in parallelism to the annulus 24. A pin 36 extends through registering openings in the arms 32 and 34 and through corresponding openings in pairs of links 38, 38 and 40, 40. The links 38, 38 are connected to a first disc 42 by means of a pin 44 retained in position by a cotter pin 46 while the links 40, 40 are connected to a second disc 48 by means of a pin 50 held in position by a cotter pin 52. Rotation of the annulus or ring 24 affords rotation of the discs 42 and 48 in parallelism each with the other while permitting limited relative axial movement. The discs 42 and 48 are desirably of cast metal such as aluminum, iron or the like.

The discs 42 and 48 may be effectively stopped by means of a friction unit indicated generally by reference numeral 54. The friction unit 54 includes a frame 56, preferably of cast iron construction, of the general configuration of a caliper and having an arcuate base section 58 provided with a pair of bosses 59 having openings 60 in register with a pair of corresponding openings in the flange 29. Machine screws 62 passing through these openings maintain the frame 56 in the position shown. The frame 56 has a segment-shaped arm 64 provided with a friction facing 66 and an arm 68, housing a hydraulic unit 70, joined to the arm 64 by a bridge section 72. Radial fins 74 extend between the base section 58 and the arms 64 and 68 for dissipating heat and for effecting the requisite rigidity of the frame 56. The facing 66 has radially extending grooves 67 for dissipation of heat and is shown as bonded to a plate 69 secured to the arm 64 by screws 71.

A brake shoe 76 provided with a friction facing 78 may be moved axially to the left, as viewed in Figure 1 by the hydraulic unit 70 for engaging the adjacent surface of the disc 42. Referring now to Figure 6, the bridge section 72 of the frame 56 is provided with a pair of axially extending rabbets 80 for sliding reception of a generally segmental friction plate 82 having outwardly extending lugs 84 which abut against the rabbets 80 to prevent relative rotation with respect to the frame 56. The friction plate 82 is provided on each side with friction facings 86 the outer surfaces of which have radially extending grooves 88 and arcuately extending grooves 90 for purposes of heat dissipation. The grooves 88 serve also to remove dust from the facings 86.

According to the present invention, the bridge section is provided with angular recesses 83 to permit the plates 82 to be moved radially into position on the bridge section 72. During the course of assembly the plate 82 is moved axially to the operating position illustrated in Figure 1. In this position axial movement is possible but radial movement is precluded, as will be understood.

Referring now more particularly to Figure 5, the hydraulic unit 70 includes a cylinder 92 integrally formed with the arm 68. The piston 94, having a peripheral groove 96 for reception of a sealing ring 98, is slidably mounted in the cylinder 92 and is provided with a recess 100 for reception of one rounded end of a piston rod or plunger 102, the other rounded end of which is received in a corresponding recess in the brake shoe 76. A sealing cup 104, of rubber, neoprene or the like surrounds the plunger 102 and is retained in position by a snap ring 106. The outer end of the cylinder 92, as viewed in Figure 1 is closed by an end plate 108 having a peripheral groove 110 for reception of a sealing ring 112. The end plate 108 is retained in position by a snap ring 114 received in a groove 115. The piston 94 is normally urged towards the brake shoe 76, to some extent, by a compression spring 116 mounted within the cylinder 92 and extending between the end plate 108 and the piston 94.

Figure 2:
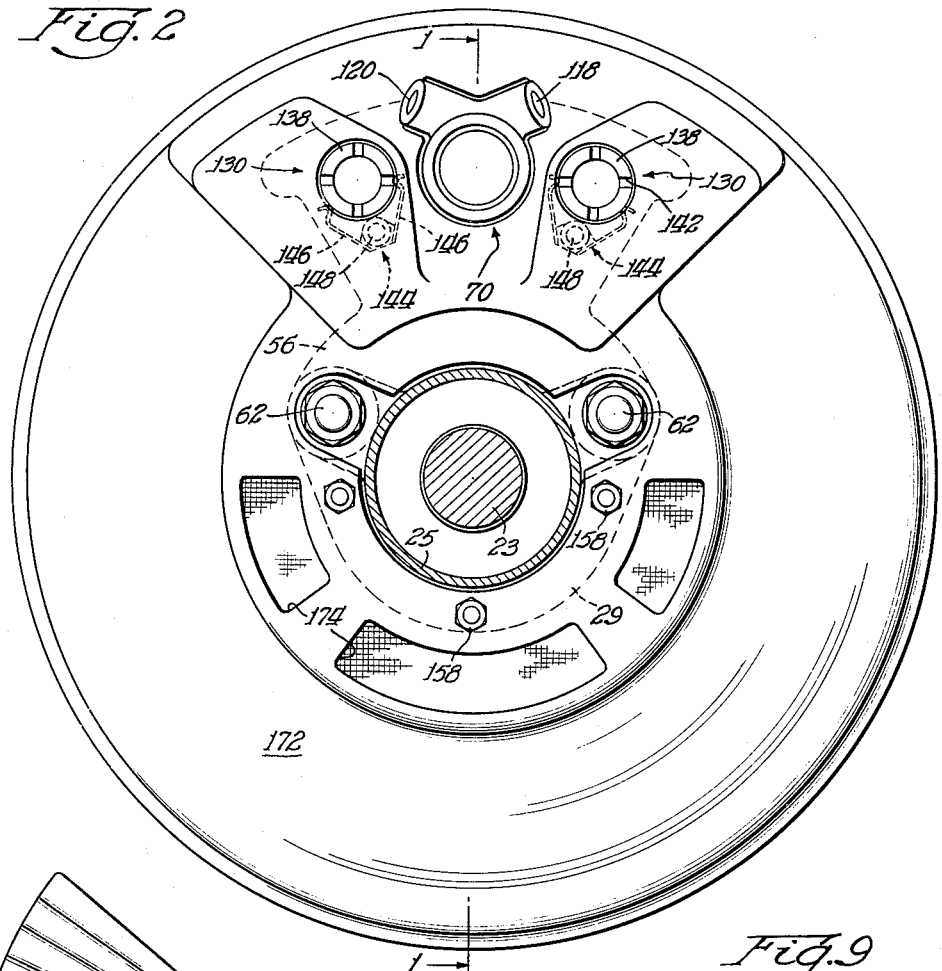
Figure 2 is an elevational view, on a reduced scale, taken substantially on line 2—2 of Figure 1.
Figure 4:
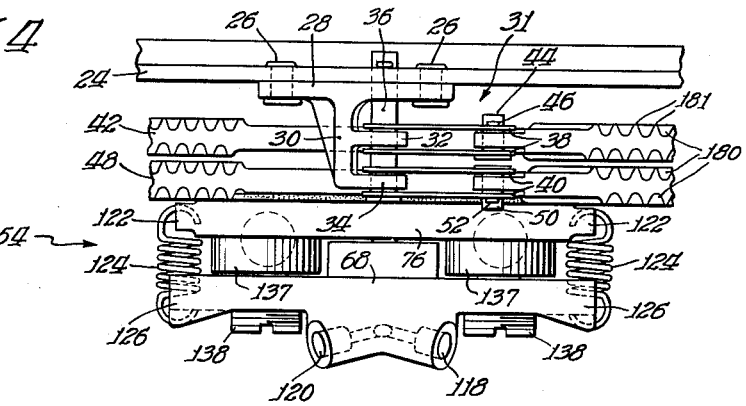
Figure 4 is a sectional plan view taken substantially on line 4—4 of Figure 3.
Figure 3:
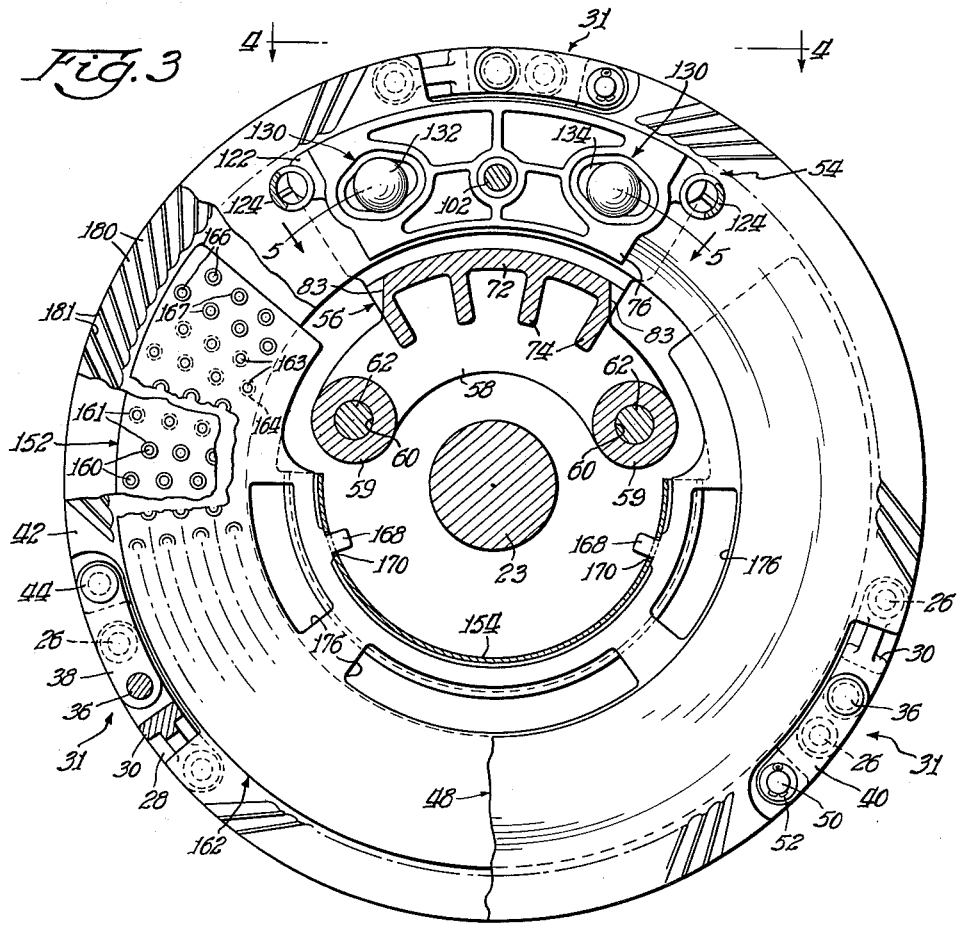
Figure 3 is a vertical sectional view taken substantially on line 3—3 of Figure 1.

Referring now to Figures 2 and 4, hydraulic fluid may be introduced into the cylinder 92 from the master cylinder (not shown) of the vehicle through inlet 118 and may flow from the cylinder 92 upon retraction of the shoe 76 in a manner that will now be described, through an outlet 120.

For retraction of the brake shoe 76 upon diminution of hydraulic pressure, a pair of ears 122 are provided in each side of the brake shoe 76 and have suitable openings for reception of one end of springs 124, the other end of each of which is received in suitable openings in a pair of ears 126 integrally formed with the arm 68. By this arrangement, proper spacing of the friction facings from the discs 42 and 48 is assured even in the absence of hydraulic pressure in the cylinder 92.

As the shoe 76 is urged to the left, as viewed in Figure 1, the adjacent side of the disc 48 is engaged by the friction facing 78 while the opposite side of the disc 48 is brought into contact with the adjacent friction facing 86 of the plate 82. The opposite friction facing 86 is moved into engagement with the adjacent face of the disc 42 which, in turn, is moved to the left to a limited extent so that its opposite face is brought into contact with the friction facing 66. Thus, the single hydraulic unit 70 affords frictional engagement on both sides of each of the discs 42 and 48.

As the hydraulic unit 70 is actuated, the resistance of the brake shoe 76 to rotational movement is converted to axial thrust, for assisting the action of the hydraulic unit 70, by a pair of self-energizing units 130 each of which includes an energizing ball 132, a seat 134 formed in the shoe 76 and registering seat 136 formed in a rotatably fixed plate 137 interposed between the shoe 76 and the arm 68. The seats 134 and 136 are preferably cammed at an angle of approximately 30° which provides a mechanical advantage of about 1.73 to 1.0. The angle of inclination of the seats may be varied, of course, within limits, to provide for the requirements of a particular installation. The coil springs 124 afford firm seating of the balls 132 in the seats 136 when the hydraulic pressure is released.

In the event of wear of the friction surfaces, compensation is easily afforded by a pair of hollow adjusting screws 138 received in threaded openings 140 in the arm 68. The inner end of each of the screws 138 abuts against one of the plates 137 and urges the plate 137 upwardly, as viewed in Figure 5. The screws 138 may be turned until all of the friction faces are under pressure and then each screw may be backed up the same number of turns to afford even pressure on the friction facings and to prevent canting.

According to the present invention, means are provided for indexing the screws 138 and for locking the screws in any predetermined position. To this end, the outer ends of the screws 138 are provided with circumferentially spaced slots 142 and, as shown best in Figure 2, a jack spring assembly 144 having angularly extending arms 146 is secured to each of a pair of studs 148 the inner ends of which are receivable in recesses 150 in the plates 137 to prevent relative rotation between the plate 137 and the arm 68, see Figures 6 and 7. The outer ends of the arms 146 of each spring 144 are bent inwardly and thence outwardly to provide a surface which may be cammed into or out of one of the slots 142. It will be noted that the spacing of the slots 142 provides for the seating of but one arm 146 at a time so that for four slots 142, for instance, eight indexing positions are possible.

It will be noted also that the plunger 102 along with the balls 132 and the springs 124 are in alignment. By this arrangement, the shoe 76 and the plate 82 tend to move axially in parallelism so that unequal wear of the friction facings is precluded. The alignment of the springs 124 is of particular importance since the only resistance of the shoe 76 prior to engagement of the lining 78 with the adjacent face of the disc 42 is the force of these springs.

According to the present invention also means are provided for turbulizing the air immediately adjacent to the surfaces of the discs 42 and 48 to prevent the formation of a stagnant film of the air thereon. To effect this result, an arcuate panel 152 is arranged to the left of the disc 42, as viewed in Figure 1, and is provided with an arcuate hub 154 and an inwardly extending radial flange 156 secured to the flange 29 by means of a plurality of circumferentially spaced fastening elements 158. The panel 152 is provided with a plurality of openings 160 defined by inwardly extending flanges 161 having ragged edges which extend into close proximate relation to the leftmost position of the disc 42, as viewed in Figure 1. An arcuate panel 162 is interposed between the disc 42 and the disc 48 and has a plurality of openings 163 defined by outwardly projecting flanges 164 and a plurality of openings 166 defined by inwardly extending flanges 167. At the inner peripheral edge of the panel 162 are a plurality of radially inwardly extending tabs 168, as shown best in Figure 8. These tabs are receivable in longitudinally extending slots 170 formed in the hub 154 and the flange 156 to afford freely floating axial movement of the panel 162, as required.

The panels 152 and 162 not only turbulize the air adjacent to the disc surfaces but also absorb heat by radiation from the discs. The panels 152 and 162 are desirably of sheet metal construction such as aluminum, steel or the like and are preferably provided with a dark coating for maximum heat absorption. The discs 42 and 48, on the other hand, preferably have a natural bright surface to obtain a relatively high value of heat emissivity.

A dust cover 172 encloses the entire brake assembly and is secured to the flange 29 by means of the fastening elements 158. This dust cover, as shown best in Figure 2, is provided with a plurality of circumferentially spaced screened openings 174 for reception of cooling air from the high pressure zone beneath the vehicle. Referring again to Figure 1, the incoming air flows axially through the center of the disc 48 and through openings 176 in the panel 162 to pass radially outwardly in contact with the surfaces of the discs 42 and 48. To prevent bypassing of the incoming air along the inner surface of the dust cover 172, an arcuate deflector 178 may be secured thereto. The peripheries of the discs 42 and 48 have angularly extending grooves 180 defining ridges 181 which extend beyond the plane of the discs and which function as fan blades to promote the flow of air radially outwardly.

It will be noted that the rabbets 80 have two surfaces engaged by the lugs 84 to absorb the force of the braking indicated by the arrows in Figure 6. The angle of these surfaces with respect to each other and with respect to the lug at the opposite end of the plate 82 affords an efficient and effective drive and permits the plate 82 to move freely axially but limits movement in any other direction to only the small amount necessary to provide free axial movement. Since the plate 82 carries the friction facings 86 and is close to the heat source, its temperature during operation of the brake will be greater than the temperature of the bridge section 72 of the frame 56 as a result, as the plate 82 expands due to heat, the clearance between the lugs 84 and the rabbets 80 tends to increase and binding is thus precluded. To faciltate mounting of the plate 82 the bridge section 72 may be narrower than the arcuate distance between the lugs 84 so that the plate may be inserted radially and then moved axially into operative position.

In operation, the shoe 76 moves only a limited distance before its friction facing 78 engages the adjacent surface of the disc 48. Preferably this distance is in the order of 0.15 inch. When frictional contact occurs the shoe 76 tends to rotate with the disc 48 and effects arcuate displacement between the shoe 76 and the plates 137. As a result, the balls 132 ride up on the seats 134 and 136 to effect axial movement of the friction assembly. Thus the energizing effect of the balls 132 supplements the force supplied by the hydraulic unit 70.

The several friction facings include an arc of approximately 60° and the remainder of the four disc surfaces are exposed to incoming cooling air. The panels 152 and 162 extend arcuately so that they are coextensive with the exposed portions of the discs 42 and 48.

The disc brake of the present invention is characterized by a relatively large heat dissipation area. In addition, assuming maximum energization, an exceedingly light pedal pressure may be obtained for a given pedal stroke by proportioning the hydraulic ratio between the master and the wheel cylinders. On the other hand, assuming normal pedal pressures, a low energizing value can be utilized which renders the present brake extremely stable in action under all weather conditions. As will be appreciated, diminished energization results in more stable and constant operation. The panels 152 and 162 are normally at a lower temperature than the discs 42 and 48 and readily absorb heat by radiation. This heat may be rapidly dissipated because of the flow of air over the surfaces of the panels, and particularly around the flanged openings 160, 163 and 166.

Figure 8:
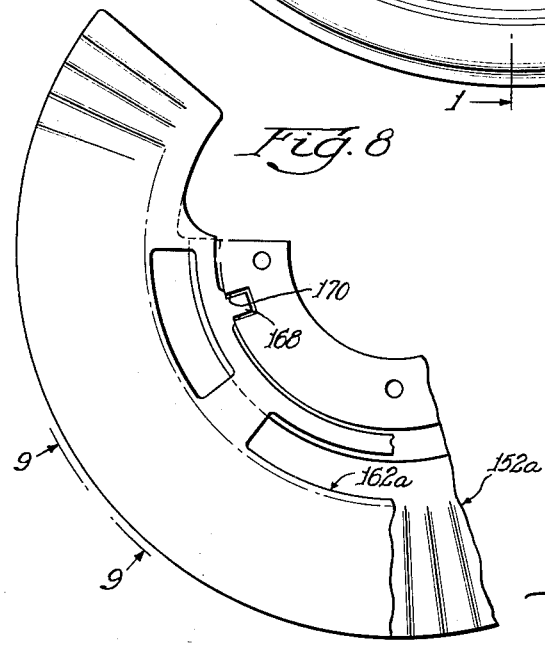
Figure 8 is an elevational view partly broken away of a detail of the disc brake of Figure 1.
Figure 9:
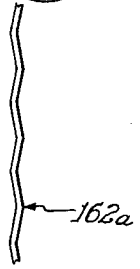
Figure 9 is an edge view taken substantially on line 9—9 of Figure 8.

In Figures 8 and 9 is shown a modified form of the present invention in which a panel 152a is provided with radial corrugations of inwardly diminishing amplitude at its outer marginal edge in lieu of openings, as in the principal form of the invention, and in which a panel 162a is similarly corrugated.

While I have described my invention in connection with certain specific embodiments thereof, it is to be understood that this is by way of illustration and not by way of limitation and the scope of my invention is defined solely by the appended claims which should be construed as broadly as the prior art will permit.

I claim:

1. A vehicle brake comprising a ring adapted to be secured to a wheel for rotation therewith, a pair of annular discs mounted on said ring for relative axial movement with respect thereto, a friction assembly operable upon actuation to engage both sides of each of said discs, and stationary panels arranged adjacent said discs, said panels having a plurality of openings defined by flanges projecting into limited spaced relation to said discs for turbulizing the air at the surfaces thereof, said panels being further operative to absorb heat from said disc by radiation.

2. A vehicle brake comprising a ring adapted to be secured to a wheel for rotation therewith, a pair of annular discs secured to said ring in a manner to afford limited axial movement, a friction assembly selectively actuatable to engage said discs, said assembly including a frame having a first arm provided with a friction facing in limited spaced relation to one side of one of said discs, a second arm, and a bridge portion extending therebetween, a brake shoe mounted on said frame, said shoe having a friction facing, an axially slidable friction plate mounted on the bridge portion of said frame between said discs and having friction facings on each side thereof, a hydraulic unit operable upon actuation to afford engagement of the friction facings with the surface of said discs, and a plurality of metal panels arranged adjacent said discs, each of said panels having a plurality of openings defined by flanges projecting into limited spaced relation to said discs for turbulizing the air at the surfaces thereof and for absorbing heat therefrom by radiation.

3. A vehicle brake comprising a ring adapted to be secured to a wheel for rotation therewith, a pair of annular discs secured to said ring in a manner to afford limited axail movement, a friction assembly selectively actuatable to engage said discs, said assembly including an axial slidable shoe having a friction facing, an axially movable friction plate interposed between said discs and having friction facings on each side thereof, a hydraulic unit operable upon actuation to move said shoe, said friction plate, and said discs axially so as to afford engagement of the friction facings with the surfaces of said discs, a plurality of metal panels arranged adjacent said discs in circumferentially spaced relation to said friction assembly, each of said panels having a plurality of openings defined by flanges projecting into limited spaced relation to said discs for turbulizing the air at the surfaces thereof and for absorbing heat therefrom by radiation, and means for effecting a circulation of air into contact with said panels to enhance the dissipation of heat therefrom.

4. A vehicle brake comprising a ring adapted to be secured to a wheel for rotation therewith, a pair of annular discs secured to said ring in a manner to afford limited axial movement, a friction assembly selectively actuatable to engage said discs, said assembly including an axailly movable shoe having a friction facing, an axially slidable friction plate interposed between said discs and having friction facings on each side thereof, a hydraulic unit operable upon actuation to move said shoe, said friction plate, and said discs axially so as to afford engagement of said friction facings with the surfaces of said discs, a plurality of metal panels arranged adjacent said discs, each of said panels having a plurality of openings defined by flanges projecting into limited spaced relation to said discs for turbulizing the air at the surface thereof and for absorbing heat therefrom by radiation, means for effecting said circulation of air into contact with said panels to enhance the dissipation of heat therefrom, and shield means surrounding the exposed portions of said discs to prevent contamination thereof.

5. In a disc brake of the multiple disc type having a plurality of rotatable annular discs; a friction assembly including axially slidable rotatably fixed friction facings interposed between adjacent discs, said friction assembly being arranged in confronting relation to a relatively small portion of the areas of said disc surfaces, means including a hydraulic unit for urging said facings into contact with said discs, and rotatably fixed means for effecting turbulization of air at the surfaces of said discs and for affording absorption of heat from said discs by radiation, said last-named means including an axially fixed panel arranged adjacent a surface of one of said discs, said panel being arcuate in configuration and being substantially coextensive with the remainder of the area of said surface of said one disc, said panel having a plurality of openings defined by flanges extending into proximate spaced relation to said disc, an axially slidable arcuate panel interposed between adjacent discs, said slidable panel being substantially coextensive with said fixed panel, said slidable panel having a plurality of openings defined by flanges extending into proximate spaced relation to one of said discs and a plurality of openings defined by flanges extending into proximate spaced relation to the other of adjacent discs, said fixed panel being integral with an arcuate axially extending hub and a radially inwardly extending flange, circumferentially spaced slots in said hub and said flange, said slidable panel having at its inner periphery a plurality of tabs receivable in said slots.

6. In a disc brake of the multiple disc type having a plurality of rotatable annular discs; a friction assembly including axially slidable rotatably fixed friction facings interposed between adjacent discs, said friction assembly being arranged in confronting relation to a relatively small portion of the areas of said disc surfaces, means including a hydraulic unit for urging said facings into contact with said discs, and rotatably fixed means for effecting turbulization of air at the surfaces of said discs and for affording absorption of heat from said discs by radiation, said last-named means including an axially fixed panel arranged adjacent a surface of one of said discs, said panel being arcuate in configuration and being substantially coextensive with the remainder of the area of said surface of said one disc, said panel having at its outer marginal edge radially inwardly extending corrugations, an axially slidable arcuate panel interposed between adjacent discs and being substantially coextensive with said fixed panel.

7. In a disc brake of the multiple disc type having a plurality of rotatable annular discs; a friction assembly including axially slidable rotatably fixed friction facings interposed between adjacent discs, said friction assembly being arranged in confronting relation to a relatively small portion of the areas of said disc surfaces, means including a hydraulic unit for urging said facings into contact with said discs, self-energizing means for assisting said hydraulic unit, and rotatably fixed means for effecting turbulization of air at the surfaces of said discs and for affording absorption of heat from said discs by radiation, said last-named means including an axially fixed panel arranged adjacent a surface of one of said discs, said panel being arcuate in configuration and being substantially coextensive with the remainder of the area of said surface of said one disc, said panel having a plurality of openings defined by flanges extending into proximate spaced relation to said disc, an axially slidable arcuate panel interposed between adjacent discs, said slidable panel being substantially coextensive with said fixed panel, said slidable panel having a plurality of openings defined by flanges extending into proximate spaced relation to one of said discs and a plurality of openings defined by flanges extending into proximate spaced relation to the other of adjacent discs, said fixed panel being integral with an arcuate axially extending hub and a radially inwardly extending flange, circumferentially spaced slots in said hub and said flange, said slidable panel having at its inner periphery a plurality of tabs receivable in said slots.

8. In a disc brake of the multiple disc type having a plurality of rotatable annular discs; a friction assembly including axially slidable rotatably fixed friction facings interposed between adjacent discs, said friction assembly being arranged in confronting relation to a relatively small portion of the areas of said disc surfaces, means including a hydraulic unit for urging said facings into contact with said discs, and rotatably fixed means for effecting turbulization of air at the surfaces of said discs and for affording absorption of heat from said discs by radiation, said last-named means including an axially fixed panel arranged adjacent a surface of one of said discs, said panel being arcuate in configuration and being substantially coextensive with the remainder of the area of said surface of said one disc, said panel having a surface of irregular configuration to induce a circulation of air, and an axially slidable arcuate panel interposed between adjacent discs, said slidable panel being substantially coextensive with said fixed panel.

9. In a disc brake of the multiple disc type having a plurality of rotatable annular discs; a friction assembly including axially slidable rotatably fixed friction facings interposed between adjacent discs, said friction assembly being arranged in confronting relation to a relatively small portion of the areas of said disc surfaces, means including a hydraulic unit for urging said facings into contact with said discs, self-energizing means for assisting said hydraulic unit, and rotatably fixed means for effecting turbulization of air at the surfaces of said discs and for affording absorption of heat from said discs by radiation, said last-named means including an axially fixed panel arranged adjacent a surface of one of said discs, said panel being arcuate in configuration and being substantially coextensive with the remainder of the area of said surface of said one disc, said panel having an irregular surface extending into proximate spaced relation to said disc, an axially slidable arcuate panel interposed between adjacent discs, said slidable panel being substantially coextensive with said fixed panel, said slidable panel having an irregular surface extending into proximate spaced relation to one of said discs and another irregular surface extending into proximate spaced relation to the other of adjacent discs, said fixed panel being integral with an arcuate axially extending hub and a radially inwardly extending flange.

References Cited in the file of this patent

UNITED STATES PATENTS

| | | |
|---|---|---|
| 1,912,716 | Lane | June 6, 1933 |
| 2,115,083 | Pierce | Apr. 26, 1938 |
| 2,304,774 | Ash | Dec. 15, 1942 |
| 2,349,001 | Phillips et al. | May 16, 1944 |
| 2,375,855 | Lambert | May 15, 1945 |
| 2,483,362 | Du Bois et al. | Sept. 27, 1949 |
| 2,655,230 | Buyze | Oct. 13, 1953 |
| 2,764,265 | Runner | Sept. 25, 1956 |
| 2,771,966 | Davey | Nov. 17, 1956 |
| 2,816,631 | Butler | Dec. 17, 1957 |
| 2,854,098 | Griswold | Sept. 30, 1958 |

FOREIGN PATENTS

| | | |
|---|---|---|
| 768,743 | Great Britain | Feb. 20, 1957 |